United States Patent [19]

Kossor et al.

[11] Patent Number: 4,527,466
[45] Date of Patent: Jul. 9, 1985

[54] AUTOMOBILE VENTILATION EXHAUST AND RAIN SHIELD

[76] Inventors: Albert A. Kossor, 13 N. 12th St., Kenilworth, N.J. 07033; Julius A. Kossor, 112 Chestnut St., West Orange, N.J. 07052

[21] Appl. No.: 633,666

[22] Filed: Jul. 23, 1984

Related U.S. Application Data

[63] Continuation-in-part of Ser. No. 520,636, Aug. 8, 1983, abandoned.

[51] Int. Cl.³ .............................................. B60J 1/20
[52] U.S. Cl. ....................................... 98/2.13; 296/152
[58] Field of Search .......................... 98/2, 2.12, 2.13; 296/84 A, 91, 152

[56] References Cited

U.S. PATENT DOCUMENTS

| | | | |
|---|---|---|---|
| 1,588,654 | 6/1926 | Brownlee | 98/2.13 |
| 1,660,893 | 2/1928 | Smith | 98/2.13 |
| 1,664,829 | 4/1928 | Parsons | 98/2.13 |
| 1,692,543 | 11/1928 | Bourgon | 98/2.13 |
| 1,825,192 | 9/1931 | Mace | 98/2.13 |
| 1,852,898 | 4/1932 | Rabourn | 98/2.13 |
| 2,034,528 | 3/1936 | Oakes . | |
| 2,749,830 | 6/1956 | George . | |
| 2,784,782 | 3/1957 | Young | 98/114 |
| 2,919,638 | 1/1960 | Mathews . | |
| 2,949,842 | 8/1960 | Crandall | 98/2.13 |
| 3,292,521 | 12/1966 | Requa . | |
| 3,434,408 | 3/1969 | Rivers et al. . | |
| 3,915,078 | 10/1975 | Woods, Jr. | 98/2.12 |

FOREIGN PATENT DOCUMENTS

| | | | |
|---|---|---|---|
| 213599 | 3/1958 | Australia | 296/152 |
| 2448990 | 9/1980 | France | 98/2.13 |

Primary Examiner—Harold Joyce
Attorney, Agent, or Firm—Martha G. Pugh

[57] ABSTRACT

A shield for facilitating ventilation of the interior of a motor vehicle, comprising a sheet of transparent semi-rigid plastic material with a flange along its upper edge containing sharp rib or barb-like protrusions near the top for fastening the upper edge of the sheet into a window trough, and a curved skirt with a flange extending outwardly from its lower edge. This keeps out rain and snow while allowing air to pass in and out of the vehicle by means of convection currents. The shield is preferably made of flexible material adapted to be cut with scissors to fit any sized window in the vehicle.

In one embodiment, the flange along the upper edge is U-shaped, and flat along the top. A plurality of small metal T-shaped locks are permanently held in the flat top to lock the device into a window trough upon rotation of the locks. This embodiment also includes a row of louvered openings spaced-apart along its length to allow air to pass in and out of the vehicle.

In another embodiment, the top edge has a slight inward bend with sharp ribs and is held in place in the window trough by a sponge-rubber cord. The louvers are also eliminated in this embodiment, which instead accommodates an inwardly-directed half-round sponge-rubber cord near its flanged lower end, which acts as a seal and anti-vibrator against the outer face of the window, when raised.

21 Claims, 18 Drawing Figures

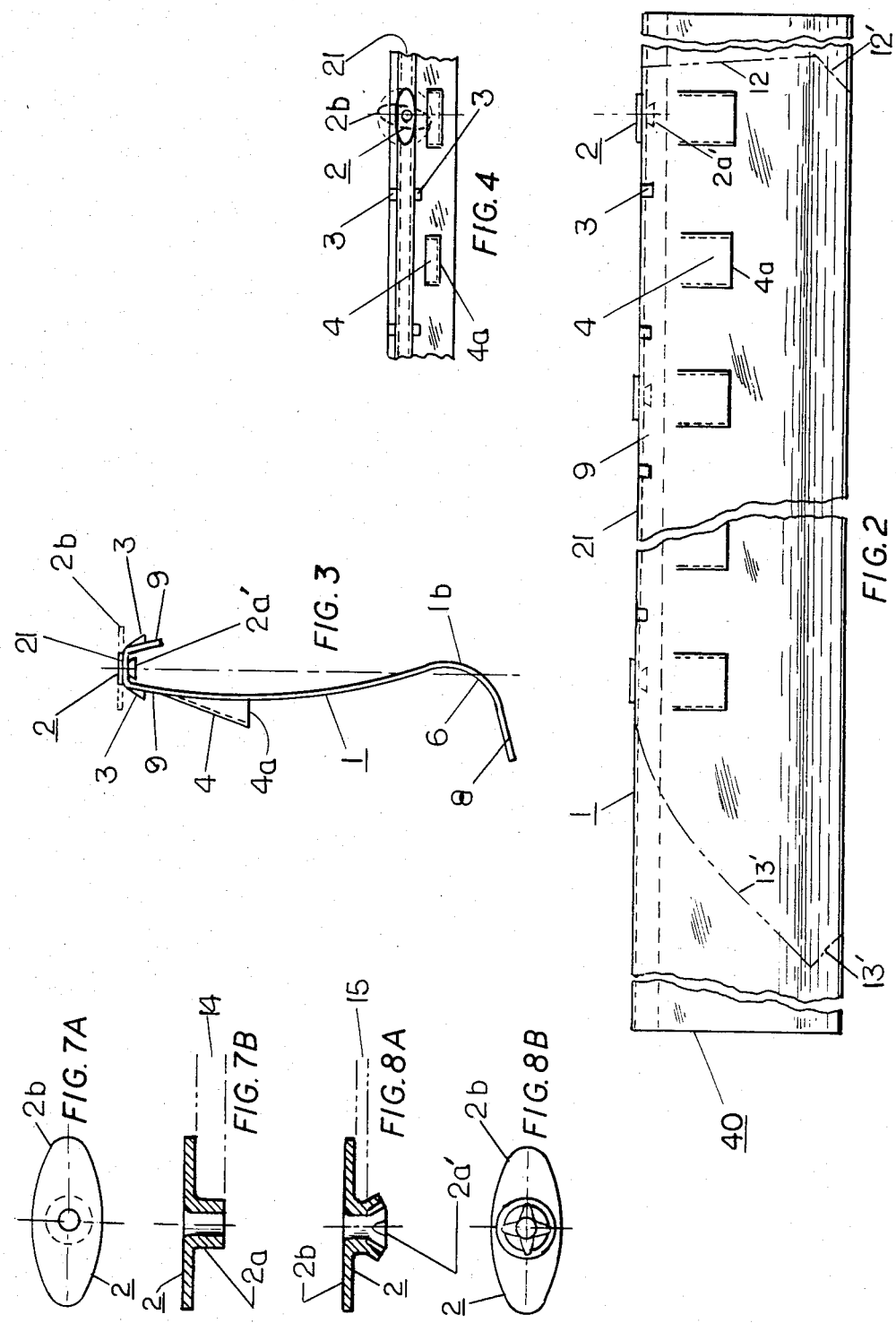

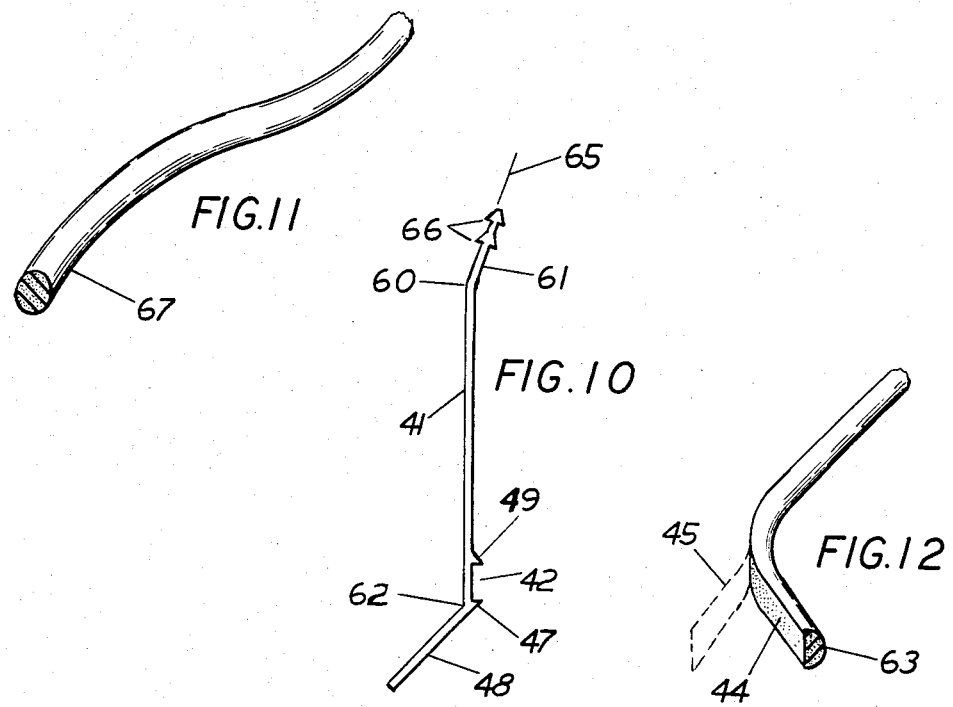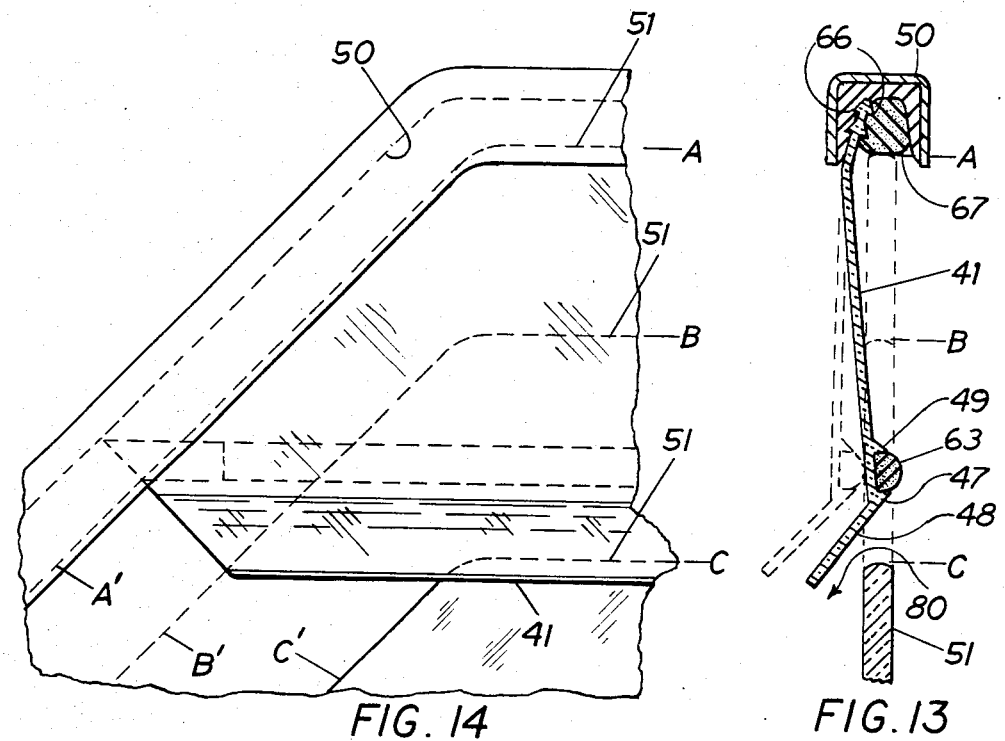

AUTOMOBILE VENTILATION EXHAUST AND RAIN SHIELD

BACKGROUND OF THE INVENTION

This is a continuation-in-part of patent application Ser. No. 520,636, filed on Aug. 8, 1983 now abandoned, entitled Automobile Ventilation Exhaust and Rain Shield.

This invention relates in general to ventilators for motor vehicles which are disposed to fit in the vehicle's window trough.

In general, automobiles manufactured in recent years no longer include front fin-windows which open out to deflect rain and snow while allowing air ventilation. Many older types of cars also lack this feature. In response to this situation, various types of prior-art ventilating devices have been constructed to fit into automobile window troughs to protect against the discomfort and distractions of air blasts and of rain and snow entering through windows.

Such prior-art ventilators are characterized by diverse types of problems. One such problem arises from the fact that many of such devices were manufactured from non-sturdy metal, rubber, or plastic materials which become distorted by ambient heat and cold, snow, rain and wind. Such distortions tend to break up or melt and render the devices useless, as well as causing damage to the window or window troughs.

Furthermore, some prior-art devices are difficult to install, and normally must also be removed to close the window. Many of the devices of the prior-art are adapted to fit only one type of window. Accordingly, this results in time-consuming installations and removals of the ventilators, to achieve ventilation in the desired part of the car. In addition, many of the prior-art devices tend to be mechanically complex and cumbersome.

In addition to the foregoing disadvantages, other types of prior-art ventilators are so designed that they can be easily removed by thieves or vandals due to lack of proper locking or anchoring means, thereby permitting a thief to reach through the resulting opening in the window and readily enter the automobile.

Others of the prior-art devices are made of opaque materials, thus resulting in a partial blocking of the view from the window in which the device is installed, and creating a safety risk. Also, many of the prior-art devices are so designed that they do not fit tightly, and create substantial noise when the car is in motion, especially at high speeds and in conditions of heavy snow or rain. Such noise serves both as an aesthetic and a safety distraction to the driver and passengers.

SHORT DESCRIPTION OF THE INVENTION

It is therefore the object of the device of the present invention to provide an improved automobile ventilator shield, more particularly one which is transparent, is easy to install securely in a window trough, so that it fits properly and makes a minimum amount of noise when the vehicle is in motion, and cannot be distorted by high heat, extreme cold, wind, etc.

Another object of the invention is to provide a device which fastens into place, and cannot readily be removed by thieves.

These and other objects are attained in the embodiments of the present invention which comprise a shield of semi-rigid plastic material which is constructed to be secured between the top edge of the window and the window trough. The shield comprises a downwardly-depending skirt which is contoured in a vertical plane to have a slight outward curvature of the upper portion, forming a slight outward concavity along its length near the lower end. This provides a spring-biased protrusion along its inside surface which rests against the external surface of the window pane. The lower edge of the concavity is bent outwardly to provide a rain and snow-deflecting flange.

In one embodiment, this shield is shaped to include an inwardly-extending inverted U-shaped flange along the upper edge which seats in and is fastened into the upper window trough. In this embodiment, the downwardly-extending skirt has a plurality of louvers extending out laterally, along its length. The shield is held in place in a window trough by small barb-like protrusions on opposite sides of the inverted U-shaped upper flange, together with a series of locking devices which penetrate its flat upper surface along its length. Each of the locking devices comprises a rotatable hollow stem secured to opposite sides of which are a pair of outwardly-extending arms. The locking devices are manually operated with screwdriver and rotated, for locking, to positions substantially normal to the principal direction of the window trough. When the ventilator is secured in this manner, the window of the automobile can be opened or closed without removing the ventilator. It is also securely locked into the window trough and cannot be removed by vandals or thieves. The window can be lowered to the bottom of the ventilating shield to allow maximum ventilation, while at the same time effectively preventing theft or vandalism. With another angular rotation of the locking devices, so that the arms are substantially parallel to the principal axis of the trough, the shield can be easily removed from the window trough, only after the window has been fully lowered.

In a modified form of the shield of the present invention, which is simpler in construction, the U-shaped construction along the upper edge is replaced by a straight flange having a slightly inward bend, having rows of continuous sharp rib projections on opposite sides, being held in place in the upper window trough by a soft sponge-rubber cord. In this embodiment, the louvers are also eliminated from the skirt. Near the lower end, a half-round sponge-rubber cord is adhesively held in place by a pair of inwardly-directed ridges which run the length of the shield adjacent the outwardly-extended flange, the sponge-rubber cord providing a seal against the window pane when the window is raised.

The shield, may be, for example, made of a transparent plastic material that provides an unobstructed view out of the window by motorists and passengers, thus providing for greater safety than many of the prior-art devices. Furthermore, in a preferred embodiment of the invention, the shield is formed of a plastic material which does not sustain substantial distortions at temperatures below 200° Fahrenheit and does not crack or become distorted at normal winter temperatures down to, say, zero degrees Fahrenheit. Typical materials suitable for the purpose are: polymethyl pentene, transparent nylon, unfilled polycarbonate, allyl diglycol carbonate, acrylics 5, 6, or 8 and cellulose acetate butyrate.

The operation of the device of the present invention is based on an external slipstream of air which flows around the shield and through the louvered openings, in one embodiment, and around the flanged, lower end of the shield in the other embodiment. This creates an internal vacuum while the automobile is in forward motion, while providing air ventilation by means of convection currents causing exhaustion of smoke and fumes, while substantially excluding rain or snow.

This aerodynamic design also provides substantial improvement over prior-art devices in the matter of noise reduction. An embodiment of the ventilation shield of the present invention has been tested by driving a vehicle in which it was installed in at 55 miles per hour into head winds, heavy rain, and cross winds with no perceptible noise, due to its semi-rigid plastic composition, and with no apparent weaknesses in structure. The vacuum created by forward motion of the automobile serves as insulation against cold in winter and against heat in summer.

Unlike prior-art devices that are difficult to install, the device of the present invention requires only a pair of scissors, a marking crayon, and a screwdriver or spatula or putty knife, for installation. The shield is adaptable to any length window, front or rear, and can be fitted to the end contours of the window which can be marked on the shield with a crayon; and because of its semi-rigid plastic composition, can be cut along the crayon line.

In one embodiment, the U-shaped flange along the upper edge conforms to the resilient window trough, to which it is secured by inserting a screwdriver, which may be of the Phillips head type, into the hollow stem of each of the locking devices, and thereby rotating the arms through, say, up to 90°, whereby the arms are embedded in the resilient walls of the window trough. Thus, a relatively unskilled automobile owner can install this device.

The other embodiment requires no locking devices, but may be secured in place by using a spatula or putty knife, or other simple tool, to force the sponge-rubber cord into the window trough to hold the flange in place at the upper end of the shield.

The device of the invention, in the forms described, is adapted for use in automobiles which have their windows mounted within their door frames in such a manner that the door frames have peripheral troughs designed to allow the windows to be raised and lowered.

The shield of the present invention has the advantages that it is durable, easily securable against theft and vandalism, easily installed, easily removed, able to withstand high heat, and creates no noise, while providing protection against high winds and heavy rain and snow.

Other objects, features, and advantages of the invention will be understood from a detailed study of the specification hereinafter with reference to the attached drawings.

BRIEF DESCRIPTION OF THE DRAWINGS

FIG. 2 is a reduced side-elevational view of the formed strip 40 from which the ventilating shield of the present invention is to be cut, showing vents, locking devices and retaining barb locations, the contour of the front portion being cut to match the shape of the window being shown in phantom.

FIG. 3 is an end-elevational showing, to approximate actual size, of the shape in a vertical plane of the formed strip 40 of FIGS. 1 and 2.

FIG. 4 is a top view of a fragment of the formed strip 40 of the present invention, showing a locking device in normally open position with the arms normal to land 21, closed position being shown in phantom.

FIGS. 7A, 7B are respectively, enlarged top and cross-sectional views of the locking device 2 before insertion in the ventilating shield of the present invention.

FIGS. 8A, 8B are respectively, enlarged top and cross-sectional views of the modified form of the locking device 2 after permenent insertion in the ventilating shield of the present invention.

FIG. 10 shows, in end elevation, a modified form of the shield of the present invention.

FIG. 11 shows, in perspective, a sponge-rubber cord used to fix the upper edge of the shield of FIG. 10 in the upper car window trough.

FIG. 12 is a perspective showing of a half-round sponge-rubber cord which fits between a pair of inwardly-directed projections adjacent the outwardly-directed flange at the lower edge of the modified shield of FIG. 10.

FIG. 13 is a sectional showing of the shield of FIG. 10, as installed in a car window.

FIG. 14 is a fragmentary side elevation of a front car window with the shield of FIG. 10, as installed.

DETAILED DESCRIPTION OF THE INVENTION

Figure 1:
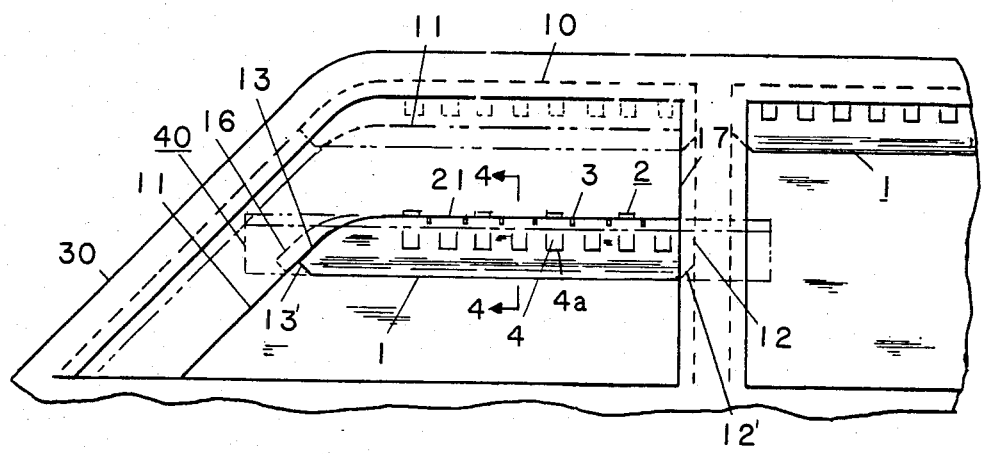
FIG. 1 is an overall side elevational view of the front and partial rear windows of a typical automobile showing a ventilator shield in accordance with the present invention in the process of being installed on the lowered front window, in position to have the ends cut and shaped to the contour of the window ends.

Referring to FIG. 1 there is shown the formed strip of the ventilating shield 1 of the present invention in the process of being put onto the window 11 of a standard passenger vehicle 30. The shield 1, in one embodiment of the present invention, comprises a heat resistant plastic material which may be, for example, such as a thermostable, unfilled polycarbonate, an acrylic molding grades 5, 6, or 8, polymethylpentene, transparent nylon, allyl digylcol carbonate, cellulose acetate butyrate, or other materials of similar characteristics, which are substantially undistorted at temperatures below 200°

Fahrenheit and having flexural moduli within the range 1.4 to 5.0 times $10^5$ pounds per square inch and a Rockwell hardness within the range M68-103 or L67-74.

The shield 1, before forming, may comprise a sheet or strip of material about 3 feet long, 3 inches wide and about 1/32 inch thick. This sheet or strip may then be thermo- or extruded-formed to include a U-shaped flange 9 bent inwardly and downwardly along its upper edge, which is flattened at the top to form a land 21, say, ¼ inch wide which fits into the window trough 10, and which terminates in an inner wall which extends down 5/16 inch on the inside. The sides of the U are each bent outwardly and downwardly from the land 21 at angles of about 100°. A plurality of T-shaped metal locking devices 2, each having a central stem of circular cross-section, are interposed rotatably through the surface of the land 21 at separations of about 4 inches along its length, so that the flat locking arms rest on the upper flat surface of land 21, either normal or parallel to the principal direction depending on whether the locking devices are closed or open, as will be described hereinafter. (See FIG. 3).

Below the top surface of the shield 1, on opposite sides of the U-shaped flange 9, are a plurality of small retaining barbs 3 about ⅛ inch wide, slanting downwardly about ⅛ inch at a small angle so that they project out about 1/16 inch to form sharp edges. The barbs 3 are spaced-apart along the length of land 21 at separations of about 2 inches, being symmetrically located lengthwise with reference to the locking devices. (See FIG. 2). About 1 inch below the retaining barbs 3, and extending about 1 inch in a lateral direction between each pair of barbs 3, is a small vent or louver 4. Each of the louvers 4 protrudes downwardly and outwardly at a small angle, say, less than 30°, forming an opening 4a at the bottom about ⅛ inch wide. The louvers 4 are spaced-apart about 2 inches in the principal direction of the land 21. The shield 1 may be constructed to accommodate any front window curvature such as 13-13' (shown in phantom) or any rear contour as indicated by 12-12' (See FIG. 1). As shown in end-elevation in FIG. 3, the outside surface of shield 1 extends from land 21 with a slight outward curvature having a radius of, say, 3 inches, a distance of about 2¼ inches in a vertical plane, to a laterally extending line indicated by 1b where the shield terminates in an outwardly-directed flange 8. The latter extends about ¾ inch in the sectional plane, and is bent to form an outwardly-directed concavity 6 having a radius of curvature say, ⅜ inch. The curved portion 6 of the flange 8 cams or presses against the window 11 as it is raised or lowered. (See FIGS. 6 and 9). The outwardly-directed flange 8 acts as a rain or snow deflector while curvature 6 reinforces the shield 1 as it presses against the window 11. The above-mentioned flange 8 forms an angle of about 130° with the plane of the window 11.

Referring to FIGS. 7A-7B, 8A, 8B of the locking device 2, the first form of the locking device 2, may, for example, have a stem or shank of uniform diameter which fits rotatably into a round hole, say ⅛ inch in diameter along the central axis of land 21, and extends an axial distance, say 3/16 inch into the hole. This may be formed of aluminum, brass or steel, 1/32 inch thick, having a cylindrical shank 2a in the form of an eyelet which is ⅛ inch in outer diameter and 1/16 inch in inner diameter. A contoured piece 9/16 inch long and ¼ inch wide forming the locking arms 2b as part of and centered on the upper edges of shank or eyelet 2b so that the arms are aligned and stick out symmetrically in opposite directions. FIGS. 7A, 7B indicate that the locking device 2 can accommodate any desired thickness 14 of material. In accordance with FIG. 8A, after insertion in the land 21 of shield 1, the hollow stem or eyelet 2a of the locking device 2 accommodating any thickness 15, is then modified by flaring the lower peripheral edge in such a manner to provide notches at 90° intervals resulting in an increased diameter 2a' and shape to permanently retain it in land 21 of shield 1 and to accommodate a Phillips head screwdriver. This serves to turn the lock up to 90° to its locked position, at which position arms 2b are perpendicular to the principal direction of land 21. The locking device 2, may be of aluminum, steel, or brass. The flared lowered edge portion of 2a' is substantially normal to the plane of arms 2b. When the locking device 2 is not in its normal, unlocked position, the arms 2b are disposed parallel to the principal axis of the land 21 of the shield 1. When in its locked position, the locking device 2 is rotated so that the arms 2b form up to a 90° angle with the plane of the window 11 and the principal axis of the land 21, and become embedded into the resilient walls of the window trough 10.

Figure 6:
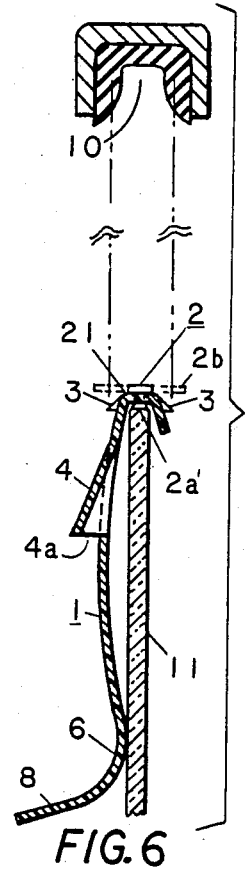
FIG. 6 is an approximate actual size exploded view in cross-section taken through the plane indicated by the arrows 6—6 of FIG. 5, with lower portion taken through plane 4—4 of FIG. 1, showing the ventilating shield of the present invention in the process of installation, the locking device being shown in open position, and in phantom in closed position.
Figure 9:
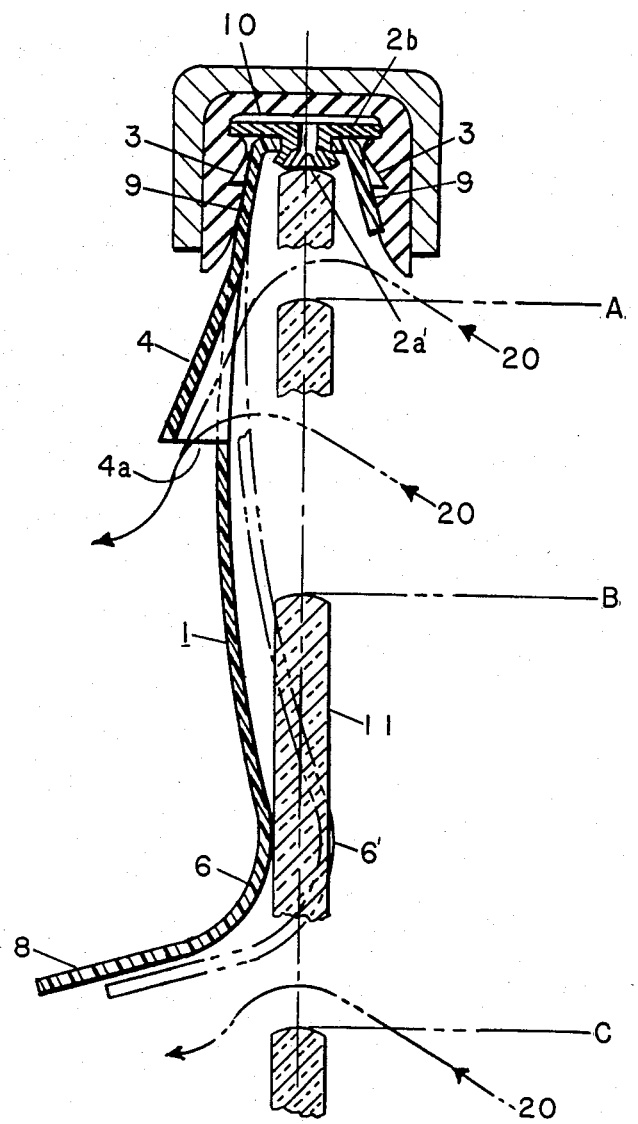
FIG. 9 is an enlarged cross-sectional view taken along the plane indicated by the arrows 6—6 of FIG. 5 showing the shield of the present invention installed in the automobile window trough of FIGS. 1 and 5 with the window raised to full height or lowered to different heights with the normal position of the shield shown in phantom.

FIGS. 6 and 9 are sectional showings, indicating how the shield 1 is placed on the window 11. In a preferred method, the inverted U-shaped flange 9 is first placed on the top edge of the window and the window 11 is then raised until the flange 9, including the retaining barbs 3 and the locking devices 2, is thereby pressed into the window trough 10. The window can then be lowered and a screwdriver, preferably of a Phillips head type, is inserted into the flared portion of the stem 2a to turn the locking device 2 clockwise or counterclockwise up to 90° until its locked position into window trough 10.

For installing this embodiment, referring to FIG. 1, the blank 40 for shield 1, is fitted to the window 11, first by placing the blank on top of the window 11 (See FIG. 6) and then cutting the shield 1 along the crayon-marked lines 13-13' with a pair of scissors, discarding the excess. The shield 1 is then pushed forward about ½ inch to position 16, shown in phantom in FIG. 1. The opposite end is then aligned with the vertical rear portion 17 of the window frame, and marked with a crayon in accordance with this alignment. The shield 1 is then cut along this crayon-marked line 12-12', discarding excess. The cuts 12' and 13' are about ½ inch long and form an angle of 45° with the cuts 12 and 13 respectively, which serve to cam-deflect shield 1 in raising and closing of window 11. The straight vertically-extending end 12-12' is then pushed back into the window trough 10. The window 11 is then raised to push the shield 1 into upper periphery of the trough 10. The shield 1 can also be marked and cut to fit rear windows in the above described manner.

Figure 5:
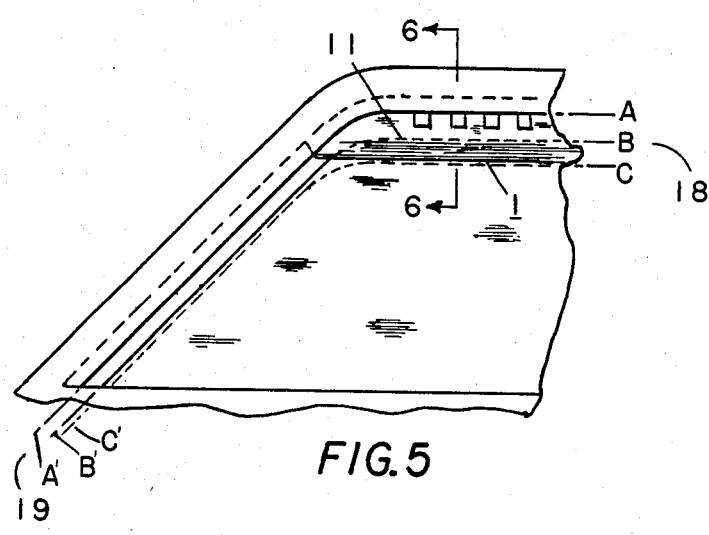
FIG. 5 is a fragmentary reduction showing of the automobile front window of FIG. 1 with the ventilating shield 1 installed in the window frame with the window open to various elevations which are indicated in phantom.

Referring to FIG. 9, enlarged, which shows the window trough 10, the window 11 and shield 1 in cross-section, the shield 1 provides various air exhaustion patterns when the window 11 is raised to various levels. Levels A-A', B-B' and C-C' provide desired air exhaustion patterns through a range of gaps 19 and 18 provided by opening the window to the respective positions A, B, or C. (See FIG. 5). Air exhaustion from the inside of the vehicle is accomplished by the passage of air through the openings 4a at the base of the louvers 4.

Referring to FIG. 9, at each of the window levels, A, B or C convection currents 20 pass over the window to provide the desired air exhaustion. In positions A and B, the currents 20 pass over the top of the window 11 and out the openings 4a of the louvers 4. In position C, the window 11 does not rest against the shield 1, but is disposed as shown in phantom with curved portion 6 resting in the normal 6' position. In this position C of window, all convection currents 20 provide maximum air ventilation admitting no rain or snow by deflector 8.

FIG. 10 is an end-elevational view of the modified shield 41, which is formed from a sheet or strip of heat-resistant material such as described with reference to FIG. 1, which is, say, about 3½ feet in overall length, 3½ inches in overall width, and about 1/16 inch thick, which is thermo or extruded-formed to provide the desired shape. Shield 41 has a flat central portion the edge of which extends about 2¼ inches in the plane of the drawing between the lines formed by bends indicated at 60 and 62. The upper portion comprises a flange 61 which extends normally about 9/16 inch to the tip forming an angle of approximately 25° with the vertically-disposed portion between 60 and 62. A second flange 48 extends outwardly from 62 for a distance of about ¾ inch, forming an angle of 45° with the vertical portion of 41.

At distances of approximately 3/32 and ¼ inch, respectively, from the tip of flange 61 are a pair of parallel rows of sharp ribs 66 which project outwardly approximately 0.04 inch from opposite surfaces, and which extend the length of the shield in a plane normal to the plane of the drawing.

Near the other end of shield 41, directly opposite the bend 62 is an inwardly-projecting rib 47, which, together with inwardly-projecting rib 49, ¼ inch above, form on the inner side of shield 41 a shallow trough or slot 42, which has a depth of 1/16 inch.

A particular feature of this modified embodiment shown in FIG. 10 is that it is adapted to be used in conjunction with the soft sponge-rubber cords 67 and 63, each 3½ feet long in the present embodiment, and having a smooth external skin. They are shown in FIGS. 11 and 12, respectively. The sponge-rubber cord 67, shown in FIG. 11, is of round cross-section, and is supplied, alternatively, in 3/16, ¼ and 5/16 inch diameters to accommodate the various widths of window troughs 50, shown in FIG. 13. The soft sponge-rubber cord 63 is of half-round section, ¼ inch in diameter. The flat rear surface is provided with a permanently adhering adhesive 44, which is protected by a peel-off paper 45, until ready for application.

FIG. 13 is a cross-sectional view of the modified shield 41 showing how the top of the shield is firmly embedded into the resilient window trough 50 of a conventional automobile by means of the rows of sharp ribs 66, which holds shield 41, embedding it into sponge-rubber cord 67 the latter compress-forced in place by use of a putty knife or ridged spatula.

The soft-sponge rubber cord thus compressed acts as a hinge within the trough 50, causing the lower portion of shield 41 to move inwardly against the car window 51. This serves to compress the second, sponge-rubber cord 63 of half-round section, which is held in place between ribs 47 and 49, against the face of window 51. This provides cushioning and reduces vibration of the shield 41 when the slipstream 100 of air is encountered as the car moves at 20-60 miles per hour speed. (See FIG. 16). With the window 51, to position C, the lower portion of the shield further deflects inwardly resulting in a gap between said window top and the outwardly-slanted portion 48 of shield 41. This gap provides exhaust and ventilation for air exhaustion 80 within the car, yet inhibits the entrance into the car of rain and snow due to the protective over-hang of the outwardly-slanted flange 48, which also acts as a caming surface for the shield 41, as the window 51 is raised and lowered. The various levels A, B and C, and the intermediate levels to which the window 51 is raised or lowered provide corresponding front window openings A', B' and C', and intermediate levels of opening for any desired level of exhaust or ventilation as indicated in FIG. 14.

Figure 16:
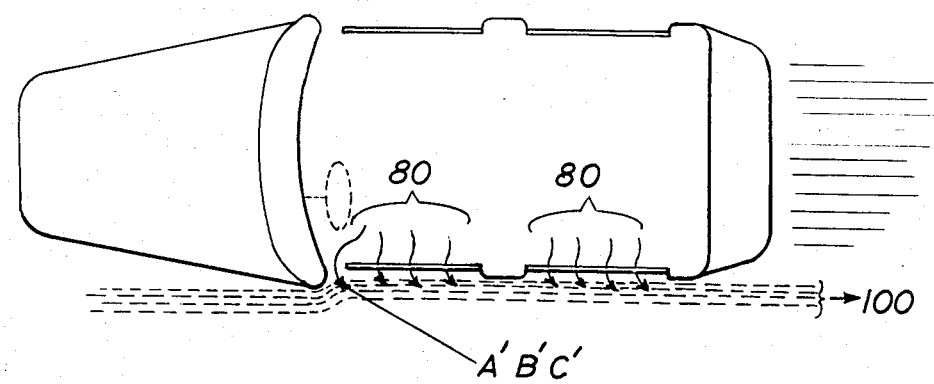
FIG. 16 is a top schematic view, with the roof removed, showing the course of air streams flowing out of the front and rear car windows in which shields in the form of FIG. 10 have been installed.

FIG. 16 is a top view, with the roof removed, in reduced schematic, indicating the effect of the slipstream of air 100 resulting in exhaust and ventilation 80 along a horizontal plane at the various range of openings A', B' and C' at the front of the window 51 as shown in FIG. 14. It is contemplated that a shield, such as 41, can be used on any or all of the conventional car windows as desired.

Figure 15:
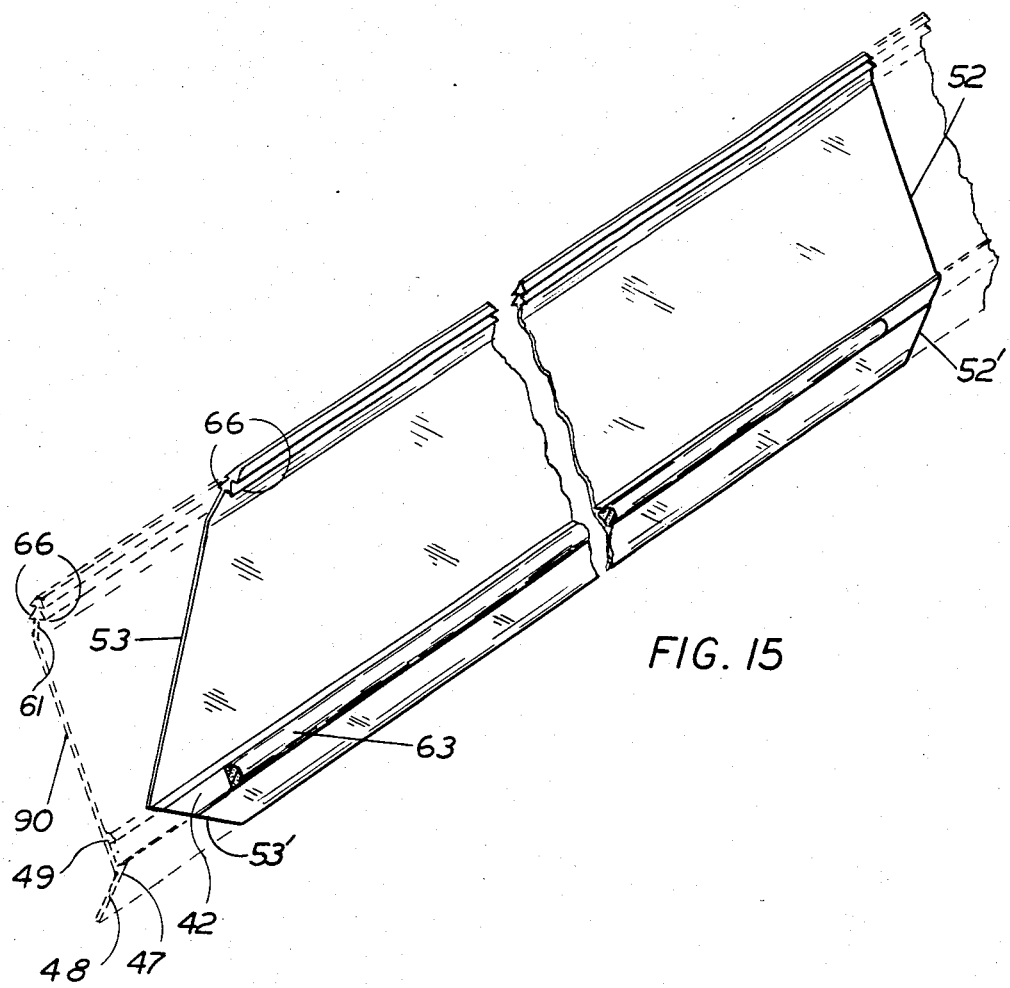
FIG. 15 is a perspective showing of the shield of the form of FIG. 10 being cut to fit a front car window.

FIG. 15 corresponds to FIG. 2 with reference to which the procedure for fitting the original model was described, the same method being generally applied to the fitting of this modified embodiment.

Referring to FIG. 14, this shows the window 51 in three different positions, A, B and C, It is contemplated that the stock piece 90, which is initially formed to include the inwardly-bent flange 61 having two inwardly-projecting rows of ribs 66, an outwardly-projecting flange 48, and internal parallel projections 47 and 49 forming the trough 42, may be obtained at any desired length. Piece 90 is then placed in the window frame of the car, and the front and rear contours marked with crayon, and the two ends cut to the desired contour 53-53' at the front, and 52-52' at the rear, in the manner previously described with reference to FIGS. 1 and 2. The half-round sponge-rubber cord 63 is cut approximately two inches shorter than the overall cut length of the shield 41. The peel-off paper 45 is removed from its flat surface and it is pressed into the trough 42, being placed so that it terminates approximately one inch from each end.

The shields 1 and 41 can be used in any weather conditions because they are heat-resistant and rain and snow and wind resistant. They can, as before mentioned, only be used with windows that are mounted in door frames having troughs.

It will be understood that the present invention is not limited to the specific forms or operations disclosed herein by way of example, but only by the scope of the appended claims.

What is claimed is:

1. A device for providing ventilation for the interior of a vehicle comprising at least one window having a frame with a peripheral trough around the top and sides, and a window pane constrained to be raised and lowered in said frame;

said device comprising a ventilating shield of semi-rigid resilient plastic material, having a length substantially corresponding to the width of the upper portion of said window frame, said shield having along its upper edge an inwardly-directed inverted substantially U-shaped flange constructed and arranged to fit into the top peripheral trough of said window frame;

means for securing said U-shaped flange in said top window trough;

said ventilating shield having a downwardly-extended skirt constructed to cover externally at least in part an upper portion of said window in open or closed position, the upper portion of said skirt having an internal concavity biased to provide contact along a substantially linear area between its lower inner surface and the outer surface of said window pane when in closed position;

said skirt terminating substantially along its lower edge below said area of contact in a downwardly and outwardly-projecting deflecting flange; and ventilating means comprising a plurality of vents interposed in spaced-apart relation along the length of said skirt.

2. The combination in accordance with claim 1 wherein said semi-rigid material comprises a transparent plastic material about 1/32 inch thick, having a flexural modulus within the range M68–103 or L67–74, which remains substantially undistorted at temperatures below 200° Fahrenheit.

3. The combination in accordance with claim 1 wherein said semi-rigid plastic material is a thermostable material selected from the group consisting of acrylic molding grade 5, 6, or 8, polymethylpentene, transparent nylon, unfilled polycarbonate, or allyl diglycol carbonate, or cellulose acetate butyrate.

4. The combination in accordance with claim 1 wherein said ventilating means comprises a plurality of outwardly and downwardly-projecting elongated louvers each having a louver opening not exceeding about ⅛ inch wide at the bottom.

5. The combination in accordance with claim 1 wherein said skirt is contoured in a vertical plane so that its upper portion has a slight outward curvature from the face of said window pane forming near its lower edge an inwardly-directed concavity with extends normal to said plane along the length of said skirt and is constructed to make spring-biased contact with an external surface of said window pane at the higher positions to which said window pane is raised, and to return to its normal form when said pane is lowered to a position below the lower edge of said skirt, wherein said concavity terminates in said outwardly-projecting deflecting flange.

6. A device for providing ventilation for the interior of a vehicle comprising at least one window having a frame with a peripheral trough around the top and sides, and a window pane contrained to be raised and lowered in said frame;

said device comprising a ventilating shield of semi-rigid resilient plastic material, having a length substantially corresponding to the width of the upper portion of said window frame, said shield having along its upper edge an inwardly-directed inverted substantially U-shaped flange constructed and arranged to fit into the top peripheral trough of said window frame;

means for securing said U-shaped flange in said top window trough;

said ventilating shield having a downwardly-extended skirt constructed to cover externally at least in part an upper portion of said window pane in open or closed position;

said skirt terminating substantially along its lower edge in an outwardly-projecting deflecting flange; and ventilating means comprising a plurality of vents interposed in spaced-apart relation along the length of said skirt;

wherein the U-shaped flange of said shield has a substantially flat zenith portion forming an elongated land of substantially uniform width along its length; and wherein said securing means comprise a plurality of T-shaped locking devices fastened in openings disposed in spaced-apart relation in a lateral direction along the length of said land, each of said locking devices comprising a hollow stem in the form of an eyelet inserted in a rotatable relation in said openings; a pair of arms fixed in diametrical relation to the top edge of each said stem projecting from the upper surface of said land, for rotating between unlocked and locked positions of said locking devices, said arms having a length from end to end which substantially exceeds the width of said land, and said arms having a width which is less than the width of said land.

7. The combination in accordance with claim 6 wherein said T-shaped locking devices are formed with the lower periphery of said stem slightly flared in cross-section to be retained therein and notched to accommodate a Phillips head type screwdriver.

8. The combination in accordance with claim 1 wherein said securing means comprise a plurality of barb-like protrusions spaced-apart on opposite sides of U-shaped flange.

9. A device for providing ventilation for the interior of a vehicle comprising at least one window having a frame with a peripheral trough around the top and sides, and a window pane constrained to be raised and lowered in said frame;

said device comprising a ventilating shield of semi-rigid resilient plastic material, having a length substantially corresponding to the width of the upper portion of said window frame, said shield having along its upper edge an inwardly-directed flange constructed and arranged to fit into the top peripheral trough of said window frame;

means for securing said flange in said top window trough;

said ventilating shield having a downwardly-extended skirt the upper portion of which has an internal concavity constructed to cover externally at least in part an upper portion of said window in open of closed position, and to make spring-biased resilient contact along an area near its lower edge with the outer surface of said window pane in closed position;

said skirt terminating substantially along its lower edge below said contact area in a downwardly and outwardly-projecting deflecting flange;

said skirt including ventilating means for providing a path for a stream of exhaust air to exit between the top edge of said window pane in partially open position and the inner face of said outwardly-projecting flange.

10. The combination in accordance with claim 9 wherein said semi-rigid material comprises a transparent plastic material about 1/32 inch thick, having a flexural modulus within the range M68–103 or L67–74, which remains substantially undistorted at temperatures below 200° Fahrenheit.

11. The combination in accordance with claim 9 wherein said semi-rigid plastic material is a thermostable material selected from the group consisting of acrylic molding grade 5, 6, or 8, polymethylpentene, transparent nylon, unfilled polycarbonate, or allyl diglycol carbonate, or cellulose acetate butyrate.

12. The combination in accordance with claim 9 wherein said skirt is contoured in a vertical plane so that its upper portion has a slight outward curvature from the face of said window pane forming near its lower edge an inwardly-directed concavity which extends normal to said plane along the length of said skirt and is constructed to make said spring-biased contact with said external surface of said window at the higher positions to which said window pane is raised, and to return to its normal form when said pane is lowered to a position below the lower edge of said skirt, wherein said concavity terminates in said outwardly-projecting deflecting flange.

13. The combination in accordance with claim 9 wherein said securing means comprise a plurality of barb-like protrusions spaced-apart on opposite sides of said inwardly-directed flange.

14. The combination in accordance with claim 13 wherein said ventilating means includes a plurality of vents interposed in the body of said shield in spaced-relation along its length.

15. The combination in accordance with claim 14 wherein the upper edge of said inwardly-directed flange is in the form of an inverted U, flat on top, which is constructed to fit into the top trough of said window frame.

16. The combination in accordance with claim 14 wherein said ventilating means comprises a plurality of outwardly and downwardly-projecting elongated louvers each having a louver opening not exceeding about $\frac{1}{8}$ inch wide at the bottom.

17. The combination in accordance with claim 14 wherein the U-shaped flange of said shield has a substantially flat zenith portion forming an elongated land of substantially uniform width along its length; and wherein said securing means comprise a plurality of T-shaped locking devices fastened in openings disposed in spaced-apart relation in a lateral direction along the length of said land, each of said locking devices comprising a hollow stem in the form of an eyelet inserted in a rotatable relation in said openings;

a pair of arms fixed in diametrical relation to the top edge of each said stem projecting from the upper surface of said land, for rotating between unlocked and locked positons of said locking devices, said arms having a length from end to end which substantially exceeds the width of said land, and said arms having a width which is less than the width of said land.

18. The combination in accordance with claim 17 wherein said T-shaped locking devices are formed with the lower periphery of said stem slightly flared in cross-section to be retained therein and notched to accommodate a Phillips head type screwdriver.

19. The combination in accordance with claim 13 wherein said shield has a substantially flat body portion; said inwardly-directed flange forms an obtuse internal angle with said body portion;

said outwardly-projecting deflecting flange is directed downwardly and outwardly constructed to form an acute internal angle with the plane of said window pane; and wherein two substantially parallel rows of inwardly-directed projections extend the length of said body portion, one interposed adjacent the apex of said downwardly and outwardly-projecting deflecting flange and the other row spaced-apart above said one row, said rows forming between them a slot running the length of said body portion.

20. The combination in accordance with claim 19 comprising a first and a second sponge-rubber cord, the first said sponge-rubber cord constructed to be interposed between said inwardly-directed flange for securing said flange in said top window trough, and the second said sponge-rubber cord constructed to be accommodated in said slot.

21. The combination in accordance with claim 20 wherein said first cord has a round cross-section; and said second cord has a half-round cross-section.

* * * * *